(12) United States Patent
Chang et al.

(10) Patent No.: US 6,614,775 B1
(45) Date of Patent: Sep. 2, 2003

(54) COMMUNICATION DEVICE AND METHOD IN MOBILE COMMUNICATION SYSTEM

(75) Inventors: Hoon Chang, Seoul (KR); Hyun-Seok Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/395,533

(22) Filed: Sep. 14, 1999

(30) Foreign Application Priority Data

Sep. 14, 1998 (KR) ........................................ 1998/38353

(51) Int. Cl.[7] ................................................. H04Q 7/28
(52) U.S. Cl. ...................... 370/341; 370/329; 370/341
(58) Field of Search ............................... 370/329, 341, 370/338, 466, 349, 335, 461, 441, 467, 535, 465, 536, 537, 539, 540, 541

(56) References Cited

U.S. PATENT DOCUMENTS 6,112,085 A * 8/2000 Garner et al. ............... 455/428
6,145,024 A * 11/2000 Maezawa et al. ............ 710/14

* cited by examiner

*Primary Examiner*—Ajit Patel
*Assistant Examiner*—Raj Jain
(74) *Attorney, Agent, or Firm*—Dilworth & Barrese, LLP

(57) ABSTRACT

A communication device and method in a mobile communication system. The mobile communication system has a plurality of service entities and a plurality of logical channels mapped to each service entity. According to one embodiment of the present invention, a communication device at a reception side has a plurality of logical channel mappers for the respective logical channels and a plurality of physical channel multiplexers/demultiplexers for physical channels. Each logical channel mapper converts a received data block mapped on a logical channel to a traffic in a predetermined format. Each physical channel multiplexer/demultiplexer defines a traffic receivable from a logical channel mapper, receives the traffic from the logical channel mapper, and demultiplexes the traffic into a corresponding physical channel.

38 Claims, 17 Drawing Sheets

COMMUNICATION DEVICE AND METHOD IN MOBILE COMMUNICATION SYSTEM

BACKGROUND OF THE INVENTION

1. Field of the Invention

The present invention relates generally to a CDMA (Code Division Multiple Access) communication system, and in particular, to a device and method of multiplexing and demultiplexing between physical channels and logical channels in a multiplex (MUX) and Quality of Service s (QoS) sublayer.

2. Description of the Related Art

The CDMA 2000 system can simultaneously provide a terminal with a plurality of services. To do so, it supports various logical channels. The logical channels correspond to physical channels via a MUX and QoS sublayer. Thus, transmission data directed from an upper service entity to a logical channel is processed into information bits of a frame of a physical channel selected for transmission by the MUX and QoS sublayer. Upon reception of the information bits, the physical layer constructs an actual physical channel frame based on the physical layer and transmits the physical channel frame.

The MUX and QoS sublayers have not to date been incorporated in the CDMA 2000 system. Presently, an IS-95-B MUX and DEMUX (demultiplex) layer can be considered for use when required. The IS-95 standard which focuses on voice transmission has been currently developed to the IS-95-B standard. The CDMA 2000 standard should ensure reverse compatibility for a terminal following the IS-95-B standard. However, the IS-95-B MUX and DEMUX layers are not suitable for the CDMA 2000 system due to lack of logical traffics and does not support physical channels defined in the CDMA 2000 system. Therefore, there is a pressing need for a new MUX and QoS sublayer which support the functions of a CDMA 2000 system as well as the functions of the IS-95-B MUX and DEMUX layer.

SUMMARY OF THE INVENTION

It is, therefore, an object of the present invention to provide a communication method in a MUX and QoS sublayer which can appropriately multiplex and demultiplex data blocks transmitted on each channel by mapping logical channels supporting various services to physical channels, and provide reverse compatibility for a terminal based on the existing communication standards.

To achieve the above object, there is provided a communication device and method in a mobile communication system. The mobile communication system includes a plurality of service entities and a plurality of logical channels mapped to each service entity. According to one aspect of the present invention, a communication device at a reception side has a plurality of logical channel mappers for the respective logical channels and a plurality of physical channel multiplexers/demultiplexers for physical channels. Each logical channel mapper converts a received data block mapped on a logical channel to a traffic in a predetermined format. Each physical channel multiplexer/demultiplexer defines a traffic receivable from a logical channel mapper, receives the traffic from the logical channel mapper, and demultiplexes the traffic into a corresponding physical channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
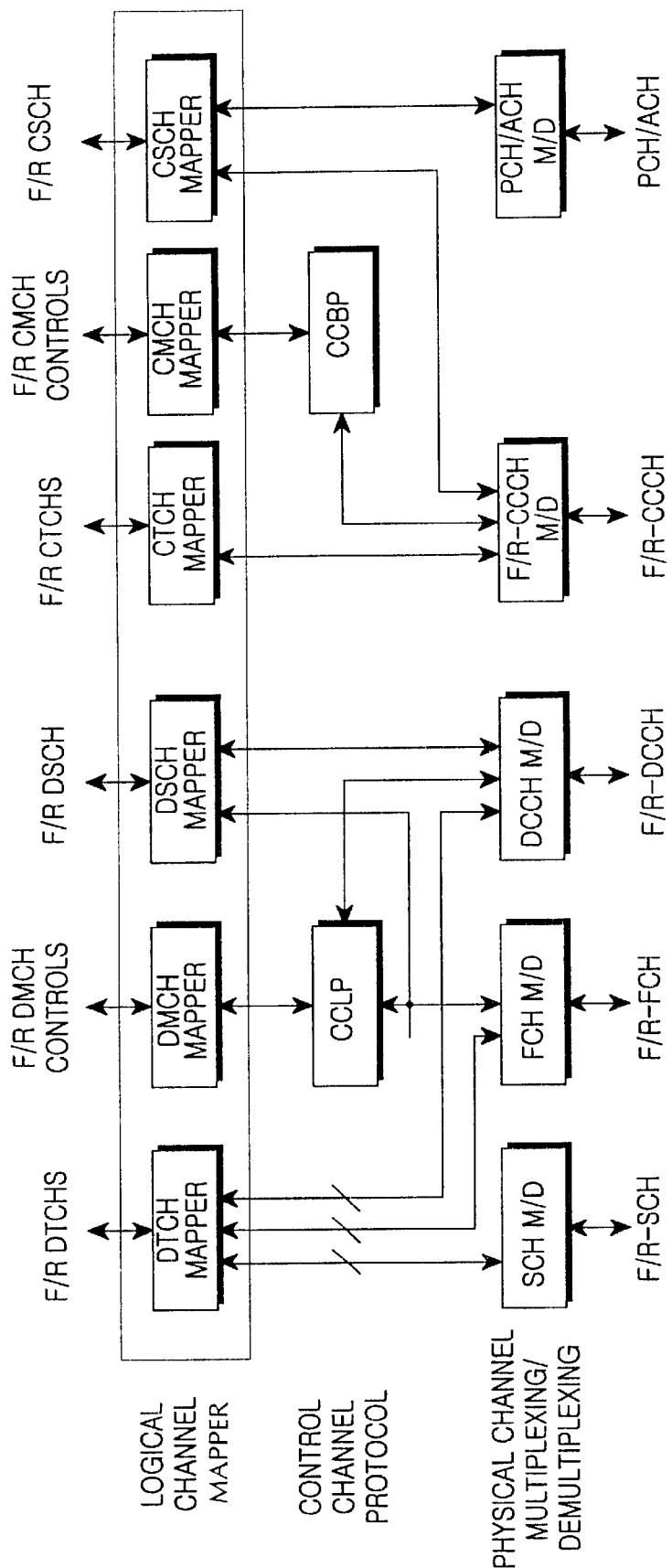
FIG. 1 illustrates the structure of a MUX and QoS sublayer to which the present invention is applied.

FIG. 1 illustrates the structure of a MUX and QoS sublayer in a CDMA 2000 system to which the present invention is applied. Referring to FIG. 1, the MUX and QoS sublayer includes physical channel multiplexer/demultiplexers (M/Ds), logical channel mappers, and control channel protocols.

Specifically, a physical channel M/D is provided for each physical channel. Each physical channel M/D produces frame information bits for a corresponding physical channel. There are five physical channel M/Ds for physical channels defined in the CDMA 2000 system, including a fundamental channel (FCH) M/D, an SCH M/D, a DCCH M/D, a forward/reverse common control channel (F/R CCCH) M/D, and a paging/access channel (PCH/ACH) M/D. These five M/Ds are shown in FIG. 1.

Each physical channel M/D receives a data stream, namely, a traffic from an upper logical channel mapper and maps the traffic with a physical channel. This relation is shown in (table 1).

TABLE 1

| Physical channel M/D | logical channel mapper | traffic |
|---|---|---|
| FCH M/D | DTCH mapper | first traffic and second traffic |
| | DSCH mapper | signaling traffic |
| | DMCH mapper | MAC control traffic |
| SCH M/D | DTCH mapper | first traffic or second traffic |
| DCCH M/D | DTCH mapper | first traffic or second traffic |
| | DSCH mapper | signalling traffic |
| | DMCH mapper | MAC control traffic |
| F/R CCCH M/D | CTCH mapper | burst traffic |
| | CSCH mapper | signalling traffic |
| | CMCH mapper | MAC control traffic |
| PCH/ACH M/D | CSCH mapper | signalling traffic |

Figure 2:
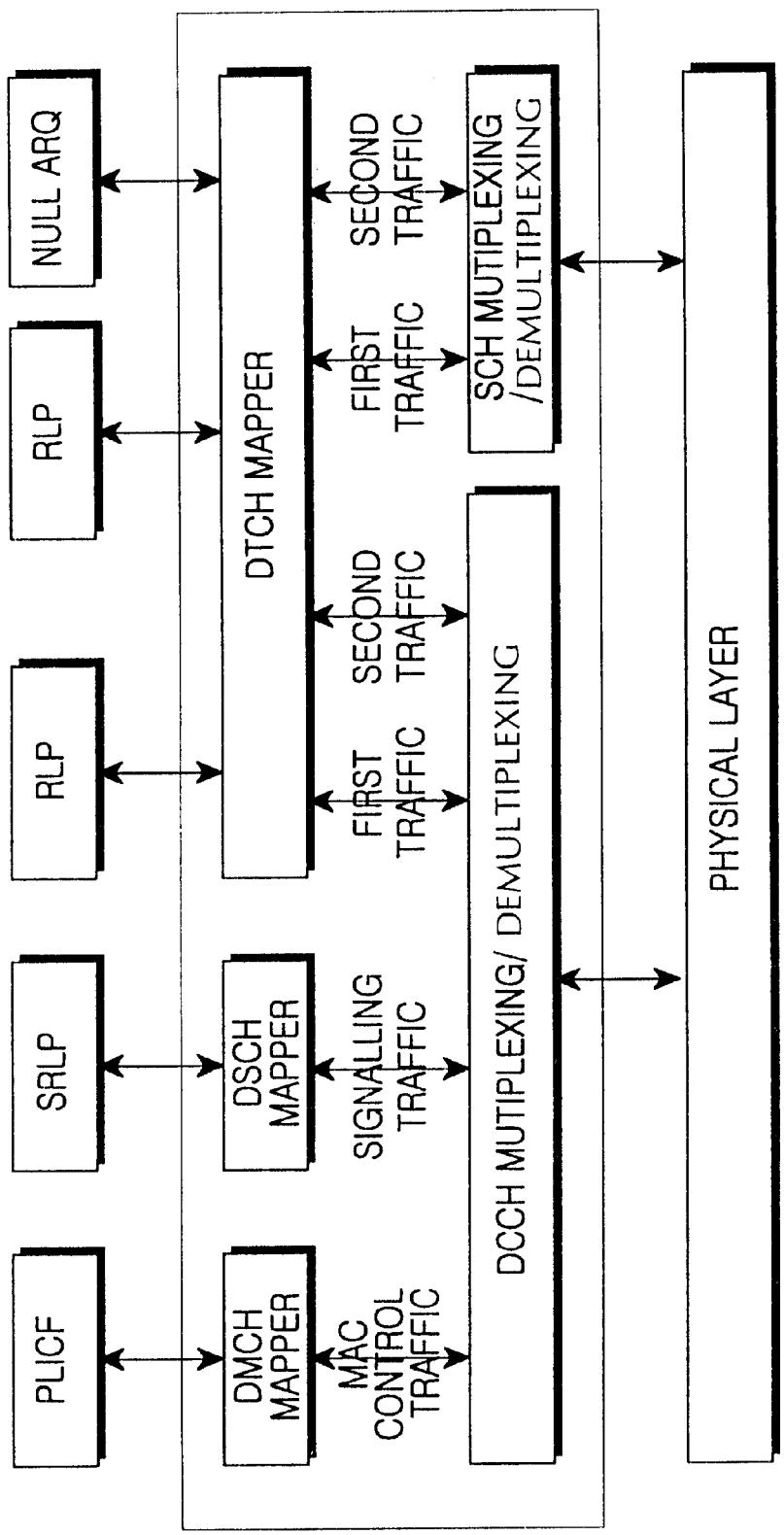
FIG. 2 illustrates entities related with a supplemental channel (SCH) and a dedicated control channel (DCCH) in the MUX and QoS sublayer to which the present invention is applied.

FIGS. 1 and 2 illustrate the contents of table 1. Each physical channel M/D is used for one physical channel and connected to one or more logical channel mappers as shown in table 1. The physical M/D processes the traffic associated with the connected logical channel mappers as a group. That is, the physical channel M/D groups the transmission units received from the logical channel mappers and transmits the traffic on the physical channel associated with the physical channel M/D to a reception side. A physical channel M/D at the reception side separates information bits of a physical channel frame received on the physical channel into separate data streams (i.e. traffics) and transmits each traffic to a corresponding upper logical channel mapper.

Data or messages generated from logical channel mappers form the traffics defined below. Physical channel M/Ds allow one or more traffics to be transmitted on a single physical channel.

(Traffics)

First and second traffics: these traffics are actual data and their priorities are determined on an FCH. The first traffic is higher than the second traffic in processing priority on the FCH, but the priorities have little influence on other channels;

Burst traffic: actual data as in the first and second traffics. The burst traffic is used without a dedicated channel whereas the first and second traffics are generated with a dedicated channel set;

Signalling traffic: signalling messages between a terminal and a base station; and MAC control traffic: control messages generated for medium access control (MAC).

A logical channel mapper groups logical channels used in upper entities into one or more traffics. The types of logical channel mappers and their functions are listed as below.

TABLE 2

| logical channel mapper | function |
|---|---|
| DTCH mapper | map DTCHs with first or second traffic |
| DSCH mapper | map a DACH with signalling traffic |
| DMCH mapper | map a DMAC with MAC control traffic |
| CTCH mapper | map a CTCH with burst traffic |
| CSCH mapper | map a CSCH with signalling traffic |
| CMCH mapper | map a CMCH with MAC control traffic |

FIG. 1 illustrates the contents of table 2. In FIG. 1, DTCHs are expressed as f/r dtch, a DSCH as fir dsch, DMCH as fir dmch control, CTCH as fir ctch, CSCH as fir csch, and CMCH as fir cmch control.

The control channel protocols include a CCLP (Control Channel Link Protocol) and a CCBP (Control Channel Burst Protocol). These protocols assist reliable transmission of MAC control messages, and are not included in the scope of the present invention.

The physical channel M/Ds and the logical channel mappers are components in the MUX and QoS sublayer. The physical channel M/Ds multiplex data received from upper entities to transmit data to entities at the reception side and demultiplex data received from the reception side. The upper entities include an RLP (Radio Link Protocol), an RBP (Radio Burst Protocol), an SRLP (Signal Radio Link Protocol), an SRBP (Signal Radio Burst Protocol), a packet data PLICF (Physical Layer Independent Control Function), a circuit data PLICF, and a null ARQ.

The relation among the physical channel M/Ds, the logical channel mappers, and the upper entities are shown in FIG. 2. FIG. 2 illustrates only the cases where dedicated channels are set. Referring to FIG. 2, data generated from the RLP and the null ARQ forms first or second traffic through a DTCH mapper. The traffic is directed to a DCCH M/D or an SCH M/D and each physical channel M/D constructs information bits to be transmitted on a physical channel. That is, the physical channel M/D is in charge and transmits the information bits to a physical layer. On the reception side, upon reception of the physical channel frame at a physical layer of the reception side, the physical layer transmits the information bits of the physical channel frame to a physical channel M/D. The physical channel M/D separates the information bytes into traffics and transmits each traffic to a corresponding logical channel mapper. The logical channel mapper transmits the received traffic to an upper entity.

Figure 3:
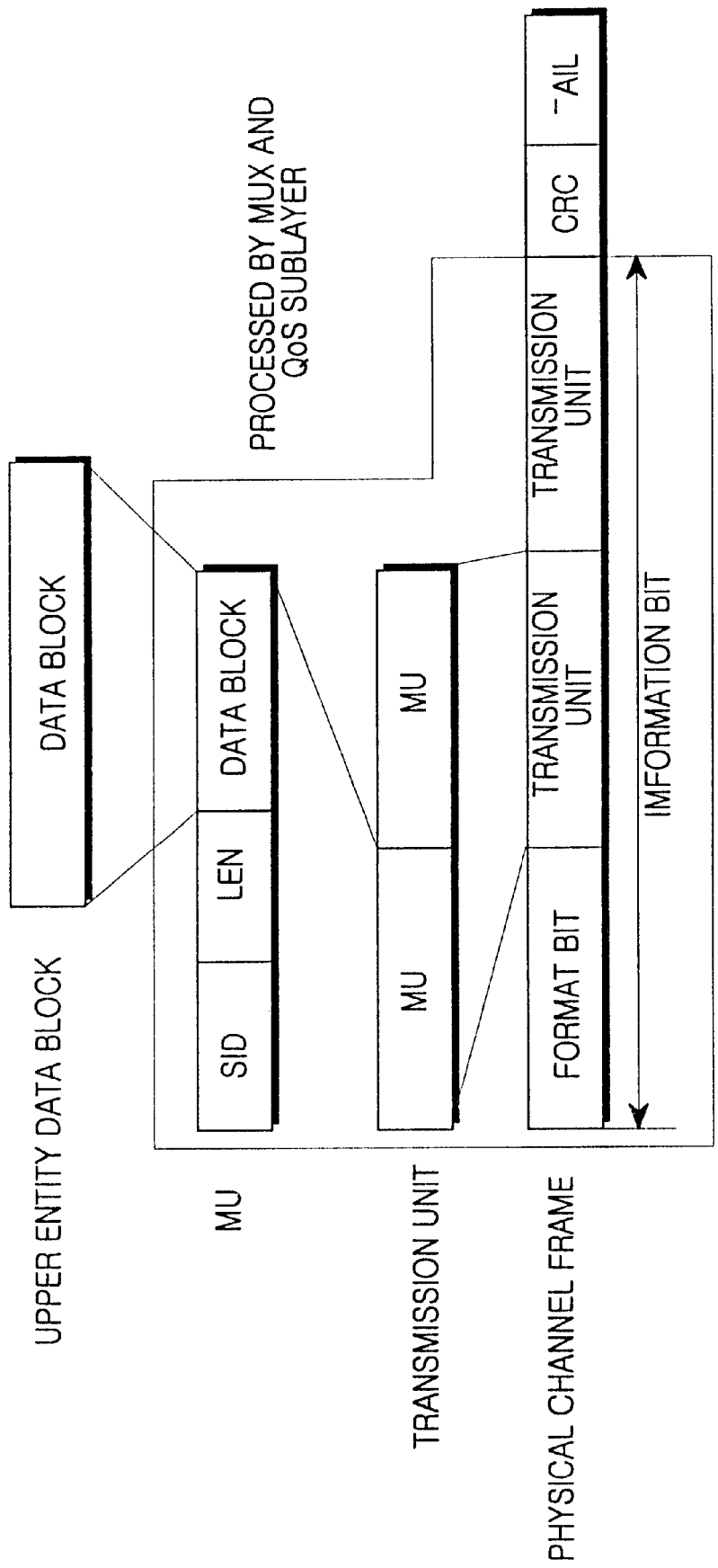
FIG. 3 illustrates the structure of a physical channel frame according to the present invention.

As described above, a data block transmitted from an upper entity is transmitted as a part of a physical channel frame. FIG. 3 illustrates units generated during multiplexing and the relation between the units. Referring to FIG. 3, there will be given a description of the function and structure of each unit.

The units used for multiplexing/demultiplexing in the present invention are an upper entity data block, a multiplex unit, a transmission unit, and a physical channel frame.

The upper entity data block is a data block generated from an upper entity (e.g. RLP or RBP) for transmission. The upper entity data block is transmitted to a corresponding logical channel mapper.

The multiplex unit is generated from the logical channel mapper which receives the upper entity data block. The logical channel mapper performs a conversion of the received upper entity data block in a multiplex unit. The multiplex unit can be different in each traffic. For example, the signalling traffic, the MAC control traffic, and the first traffic have different multiplex units. That is, the signaling traffic size can utilize a multiplex unit type 1, the MAC control traffic can utilize a multiplex unit type 2, and the first traffic and the second traffic can utilize a multiplex unit type 3. One traffic unit can accommodate the same type of traffic. For example, if a signalling traffic is converted into a multiplex unit, the multiplex unit should accommodate the signalling traffic afterwards. The multiplex unit is comprised of a service identification (SID) providing information about a data block destination and LEN (length) indicating the length of a data block. The logical channel mapper performs a conversion of the multiplex unit into a transmission unit.

The transmission unit is transmitted from a logical channel mapper to a physical channel M/D. The transmission unit can include one or multiplex units according to the multiple unit type. The physical channel M/D constructs information bits of a physical channel frame from the transmission units received from the logical channel mapper.

The physical channel frame is a bit sequence transmitted on a physical channel. The physical channel frame is divided into information bits, a frame quality indicator, and a coding tail. The frame quality indicator and the coding tail are inserted into a physical layer, and their description is omitted herein. Here, it is to be noted that the frame quality indicator can be omitted.

The physical channel M/D loads the transmission units received from the logical channel mapper as information bits based on a rule. This rule is called an information bit structure (IBS). One or more IBSs are preset between the MUX sublayers of the transmission and reception sides, as is also true for the QoS sublayers. Each IBS in the set has format bits which identifies the IBS. The transmission side performs the conversion of the format bits of an IBS used therein in an information field of a physical channel frame so that the reception side can interpret the information bits correctly. If there is only one IBS in an IBS set, the transmission and reception sides need not use format bits since only one IBS is in use.

The physical channel M/D transmits the information bits of the physical channel frame to a physical layer. Then, the physical layer processes the received information bits and transmits the processed information bits to the reception side. The physical layer at the reception side transmits the information bits of the received physical layer frame to a physical channel M/D. The physical channel M/D transmits the data block to an upper entity as the reverse procedure reverse heretofore described for the transmission side.

The components of the MUX and QoS sublayer and transmission between the components are summarized in table 3.

TABLE 3

| upper component | lower component | Transmission channel | unit to be transmitted |
|---|---|---|---|
| upper entity | logical channel mapper | f/r dtch, f/r dsch, f/r dmch _control, f/r ctch, f/r csch, and f/r cmch control | upper entity data block |
| logical channel mapper | physical channel M/D | first traffic, second traffic, burst traffic, signalling traffic, and MAC control traffic | transmission unit |
| physical channel M/D | physical layer | — | information bits |

Figure 4:
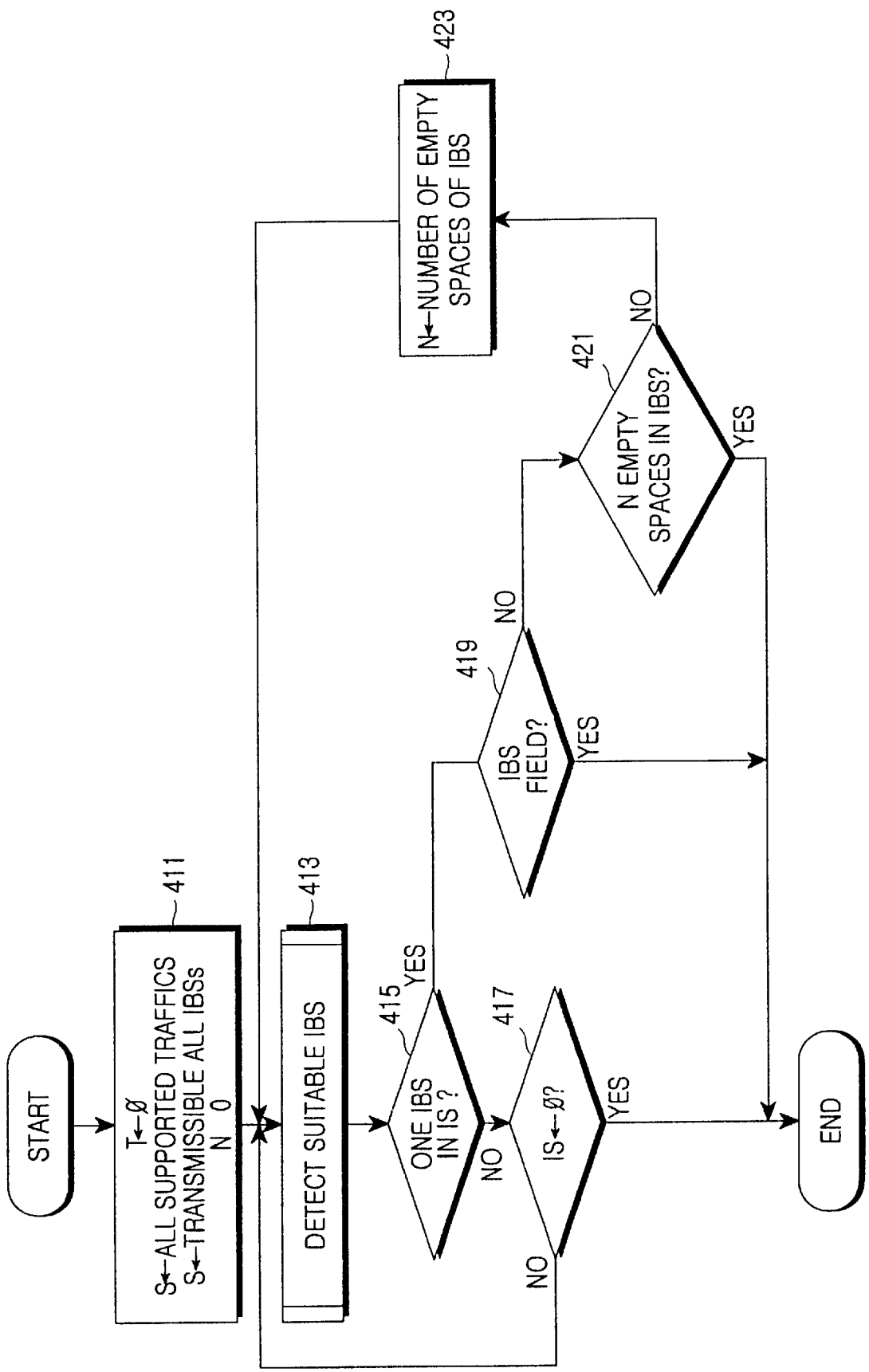
FIG. 4 is a flowchart depicting a physical channel multiplexing/demultiplexing operation according to the present invention.
Figure 5A:
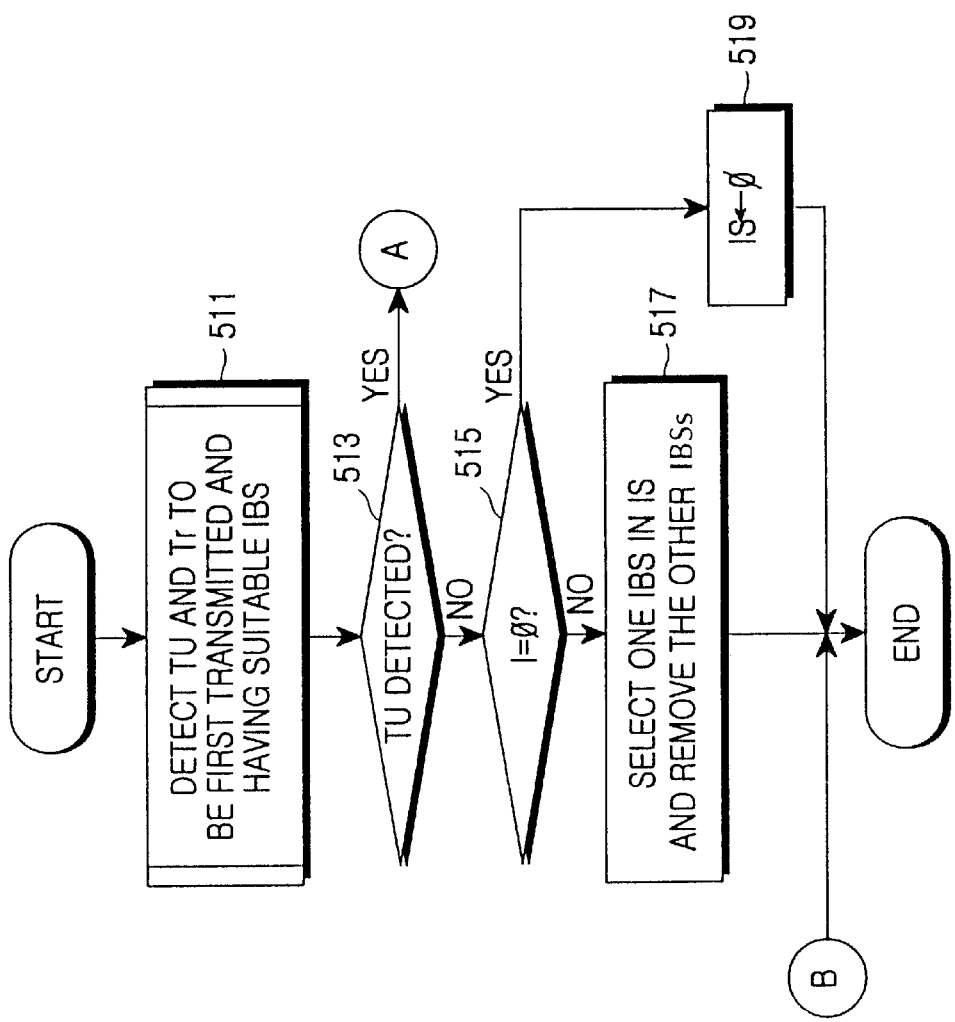
FIG. 5 is a flowchart depicting a method of searching for an information bit structure in FIG. 4.
Figure 5B:
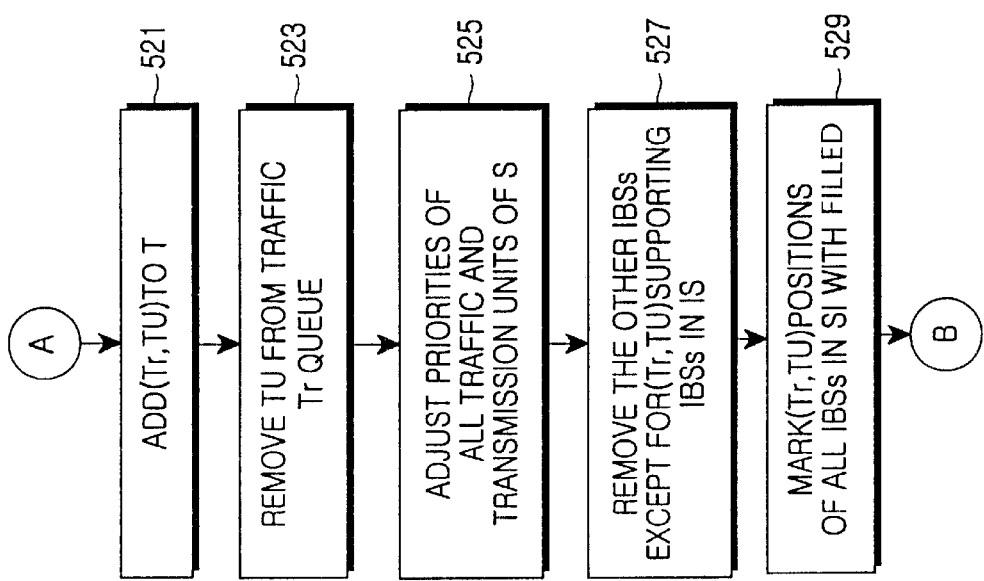
Figure 6A:
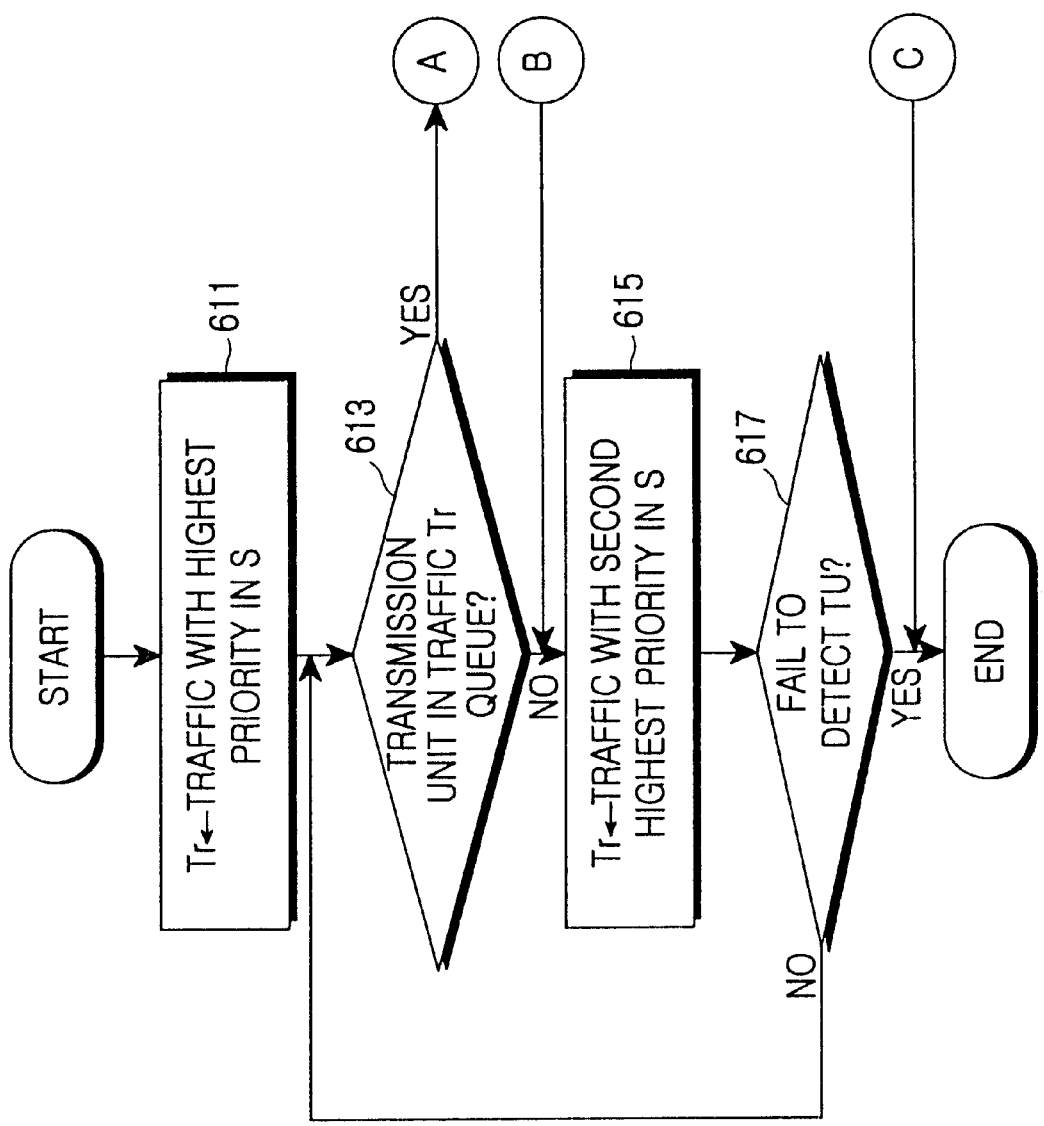
FIG. 6 is a flowchart depicting a method of searching for a transmission unit and a traffic in FIG. 5.
Figure 6B:
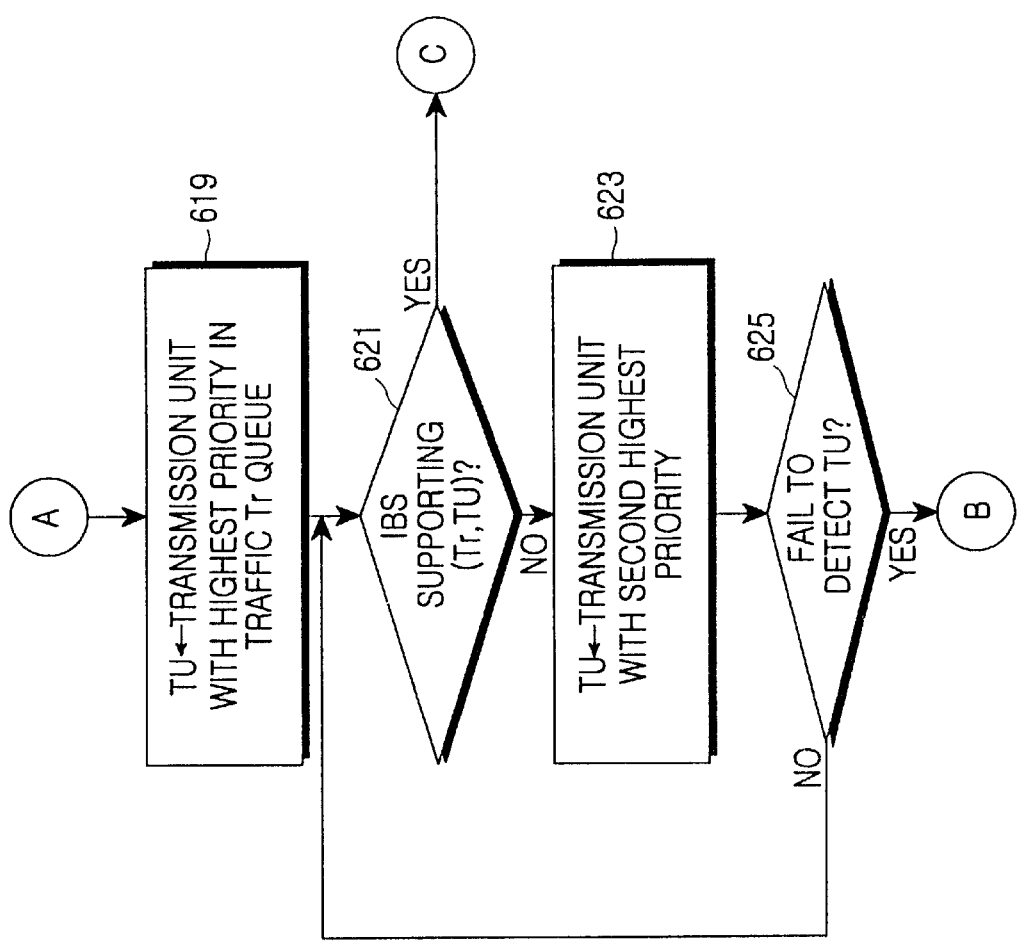
Figure 7:
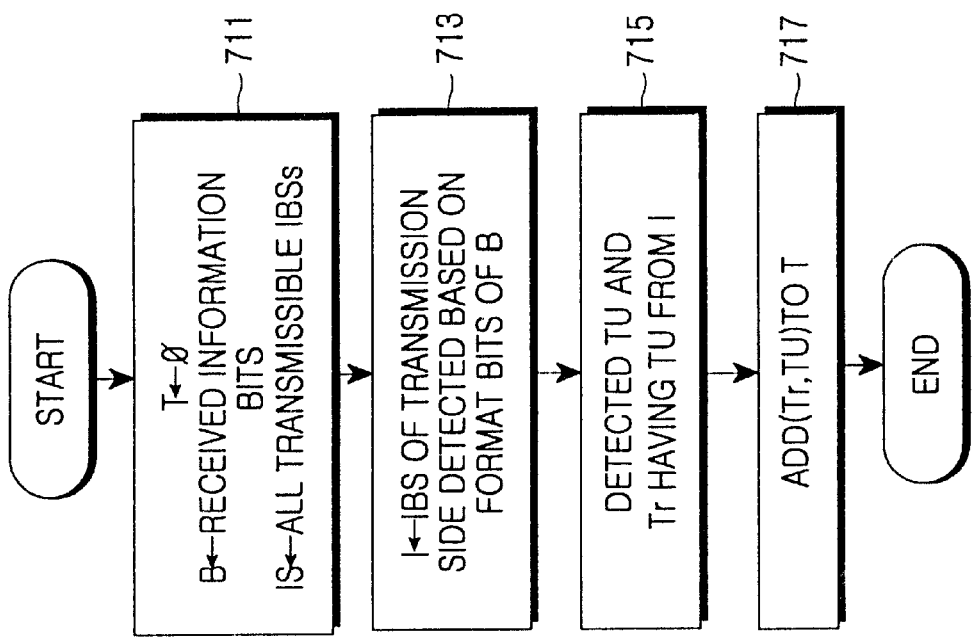
FIG. 7 is a flowchart depicting a physical channel multiplexing/demultiplexing operation upon reception of data according to the present invention.

FIGS. 4 to 7 illustrate operations of physical channel M/Ds in relation to the above description. FIGS. 4, 5, and 6 are flowcharts depicting operations of a physical channel M/D at a transmission side, and FIG. 7 is a flowchart depicting the operation of a physical channel M/D at a reception side. The following description is provided assuming the following arbitrary prioritization: signalling traffic (highest priority), the MAC control traffic, the first traffic, and the second traffic (lowest priority).

To send a physical channel frame, the physical channel M/D at the transmission side determines the first transmission unit to send among traffics which it supports at present. Each transmission unit received from a logical channel mapper is stored in a corresponding traffic queue. Given the initial conditions of transmission units stored in corresponding traffic queues, the physical channel M/D operates in accordance with the flowchart of FIG. 4 described below.

Referring to FIG. 4, a buffer T for storing the transmission unit to send is initialized and all traffics which are currently supported are stored in a buffer S, in step 411. For example, in accordance with table 1, an FCH M/D is capable of storing a signalling traffic, a MAC control traffic, a first traffic, and a second traffic in the buffer S. Each traffic will be hereinafter generically referred to as an ST. A transmission unit may be present in or absent from an ST. In addition, each physical channel M/D stores at least one available IBS in a buffer IS.

The physical channel M/D searches for the most suitable IBS for transmitting transmission units among the IBSs stored in the buffer IS, in step 413. The search will be described in detail referring to FIG. 5.

Referring to FIG. 5, the physical channel M/D searches for an ST and a transmission unit of the ST to be transmitted first and suitable for one of the IBSs included in the buffer IS, in step 511. The search for the transmission unit and traffic is illustrated in FIG. 6.

In FIG. 6, the physical channel M/D searches for an ST with the highest priority among STs stored in the buffer S and defines the ST as Tr in step 611. The first traffic defined as Tr is the signalling traffic given the priority assumptions previously described. The physical channel M/D determines whether there is any transmission unit in the Tr, in step 613. In the absence of a transmission unit in the Tr, the physical channel M/D searches for a traffic with the second highest priority in step 615. Based on the priority assumptions, the MAC control traffic follows the signalling traffic in priority. In step 617, the physical channel M/D defines the traffic with the second highest priority as a new Tr. If the new traffic is stored in the Tr, the physical channel MI/D returns to step 613 to determine whether there is any unit to be transmitted in the Tr. If it is determined that there is no traffic having a transmission unit by repeating the above procedure, the program ends.

If there exists a traffic having transmission units in step 613, the physical channel M/D searches for a transmission unit with the highest priority in the Tr and designates the transmission unit as the one to be processed by use of a pointer in step 619. The transmission unit indicated by the pointer is termed TU. After the Tr and TU are searched, the physical channel M/D determines whether the buffer IS has an IBS which can support the Tr and TU, in step 621. If a of the suitable IBS is found, the procedure of FIG. 6 ends and the physical channel M/D proceeds to step 513 of FIG. 5.

In the absence of finding a suitable IBS, the physical channel M/D searches for a transmission unit with the second highest priority in the Tr and defines it as a new TU in step 623. If there is no transmission unit following the existing TU in priority, the procedure returns to step 615 where a traffic following the existing Tr stored in the buffer is searched. If there is no IBS supporting the new Tr and TU as a result of repeating the subsequent steps, the physical channel M/D searches for a transmission unit following the obtained TU in priority in step 623. In the presence of an IBS supporting the obtained Tr and TU, the physical channel M/D returns to the procedure of FIG. 5 with the obtained Tr and TU. Otherwise, if the physical channel M/D fails to find a satisfactory IBS with respect to all Trs and TUs in the buffer S, it returns to the procedure of FIG. 5 without any IBS.

After the procedure of FIG. 6 is completed, the physical channel M/D determines whether a satisfactory TU has been found in the procedure of FIG. 6 in step 513. If the TU has been found, the physical channel M/D goes to step 521, and otherwise, it goes to step 515.

In step 521, the physical channel M/D determines to perform the conversion of the TU and Tr into a current physical channel frame. That is, the obtained (Tr, TU) is added to the buffer T of traffics to be transmitted and transmission units in FIG. 6 and the TU is removed from a traffic Tr queue in step 523. In step 529, the remaining IBSs of the buffer IS are marked to indicate that (Tr, TU) filled portions were used.

The physical channel M/D checks the buffer T to determined whether there exists a transmission unit to be transmitted in step 515. In the absence of any transmission unit in the buffer T, the physical channel M/D initializes the buffer S in step 519 and returns to the procedure of FIG. 4. If a satisfactory transmission unit was not found in the procedure of FIG. 6 but there is a previously searched transmission unit in the buffer T, the physical channel M/D selects an IBS in the buffer IS, stores the IBS with the other IBSs deleted, and goes to step 415 of FIG. 4.

In step 415 of FIG. 4, the physical channel M/D determine whether the buffer S has only one IBS. If only one IBS exists in the buffer S, the physical channel M/D goes to step 419, and otherwise, it goes to step 417. The physical channel M/D determines whether there is no IBS in the buffer IS, in step 417. In the absence of any IBS in the buffer S, the procedure ends. In the presence of an IBS in the buffer IS, the physical channel M/D returns to step 413 and searches for an appropriate IBS again. In step 419, the physical channel M/D determines whether all IBSs found are filled. If all the IBSs are not filled, the physical channel M/D returns to step 413 and repeats the above procedure. If the remaining empty spaces of the IBSs are filled, the procedure ends. If there is an empty space but no transmission unit to be filled in the space is found, the procedure ends.

If there is no traffic to be transmitted and transmission units after the procedure, the buffer IS is vacant. Otherwise, the buffer T has traffic and a transmission unit to be transmitted and the buffer IS has one IBS in which a transmission can be filled. The transmission unit of the buffer T is converted into an appropriate portion of the IBS and transmitted to a physical layer.

FIG. 7 is a flowchart depicting an operation of a physical channel M/D at a reception side. In step 711, a buffer T for storing a transmission unit to be first transmitted is initialized, IBSs which can be transmitted at preset are stored in a buffer IS, and information bits of a physical channel frame received through a physical layer are stored in a buffer B. upon storage of the information bits in the buffer B, the physical channel M/D searches for an IBS used at t he transmission side in the buffer IS, referring to the format bits of the received information bits, in step 713. The physical channel M/D obtains a transmission unit TU and a traffic Tr to which the transmission unit TU belongs from the information bits based on the detected IBS in step 715, and adds the obtained (Tr, TU) to the buffer T.

After a set of a traffic and a transmission unit is obtained in the procedure of FIG. 7, the physical channel M/D transmits the received transmission unit to a logical channel mapper which communicates traffic with the physical channel M/D.

Figure 8:
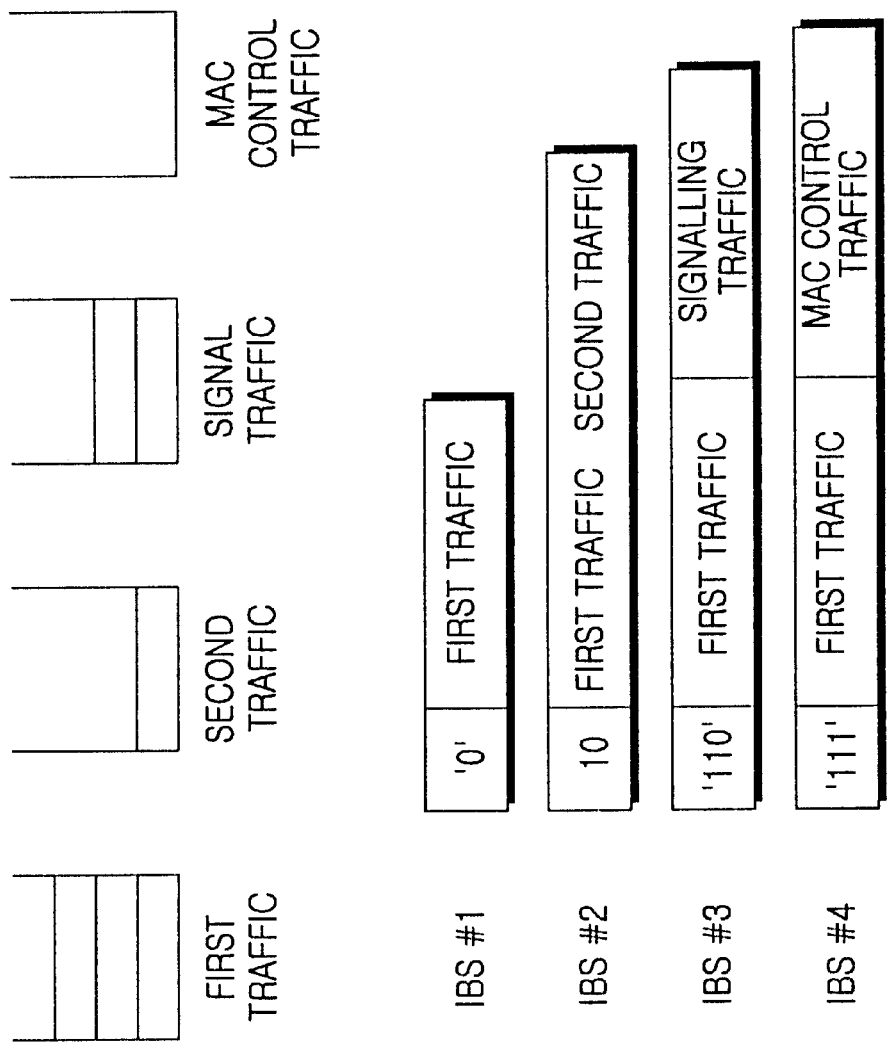
FIG. 8 illustrates an example of a buffer structure and an information bit structure for each traffic type according to the present invention.

Referring once again to the transmission side, FIG. 8 illustrates an operation of an FCH M/D by way of example. The FCH M/D receives first and second traffic from a DTCH mapper, a signalling traffic from a DSCH mapper, and a MAC control traffic from a DMCH mapper. It is assumed that each traffic queue is configured as shown in FIG. 8, four IBSs exist, and the signalling traffic, the MAC control traffic, the first traffic, and the second traffic have higher priorities in this order. In this case, the buffer S has the first and second traffic, the signalling traffic, and the MAC control traffic, and the buffer IS includes the four IBSs in FIG. 4.

Upon entry into the operation of FIG. 4, the procedure of FIG. 6 is first performed and a traffic to be first transmitted and for which an IBS exists is the signalling traffic. Based on the results of the procedure shown in FIG. 6, the signalling traffic and transmission units thereof are stored in the buffer T, a transmission unit is removed from a signalling traffic queue, and the transmission priorities of all the traffic stored in the buffer S and the transmission units of the traffics are updated in the procedure of FIG. 5. The other IBSs of the buffer IS except for an IBS #3 with the signalling traffic are removed.

Returning to FIG. 4, the buffer IS has only the IBS #3 and the buffer T includes the signalling traffic and transmission units thereof. Because the IBS #3 still has an empty space, the physical channel M/D repeats the above procedure. Then, the first traffic and a transmission unit thereof are obtained in the procedure of FIG. 6, and after the procedure of FIG. 5 is performed, the signalling traffic and the first traffic are stored in the buffer T, the IBS #3 is stored in the buffer IS, and the IBS #3 is marked to indicate that it is full of traffics to be transmitted. Then, the physical channel M/D constructs information bits including the first traffic, the signalling traffic, and format bits 110 based on the contents of the buffers T and IS and transmits the information bits to the physical layer. Thus, the procedure at the transmission side is complete.

Figure 9:
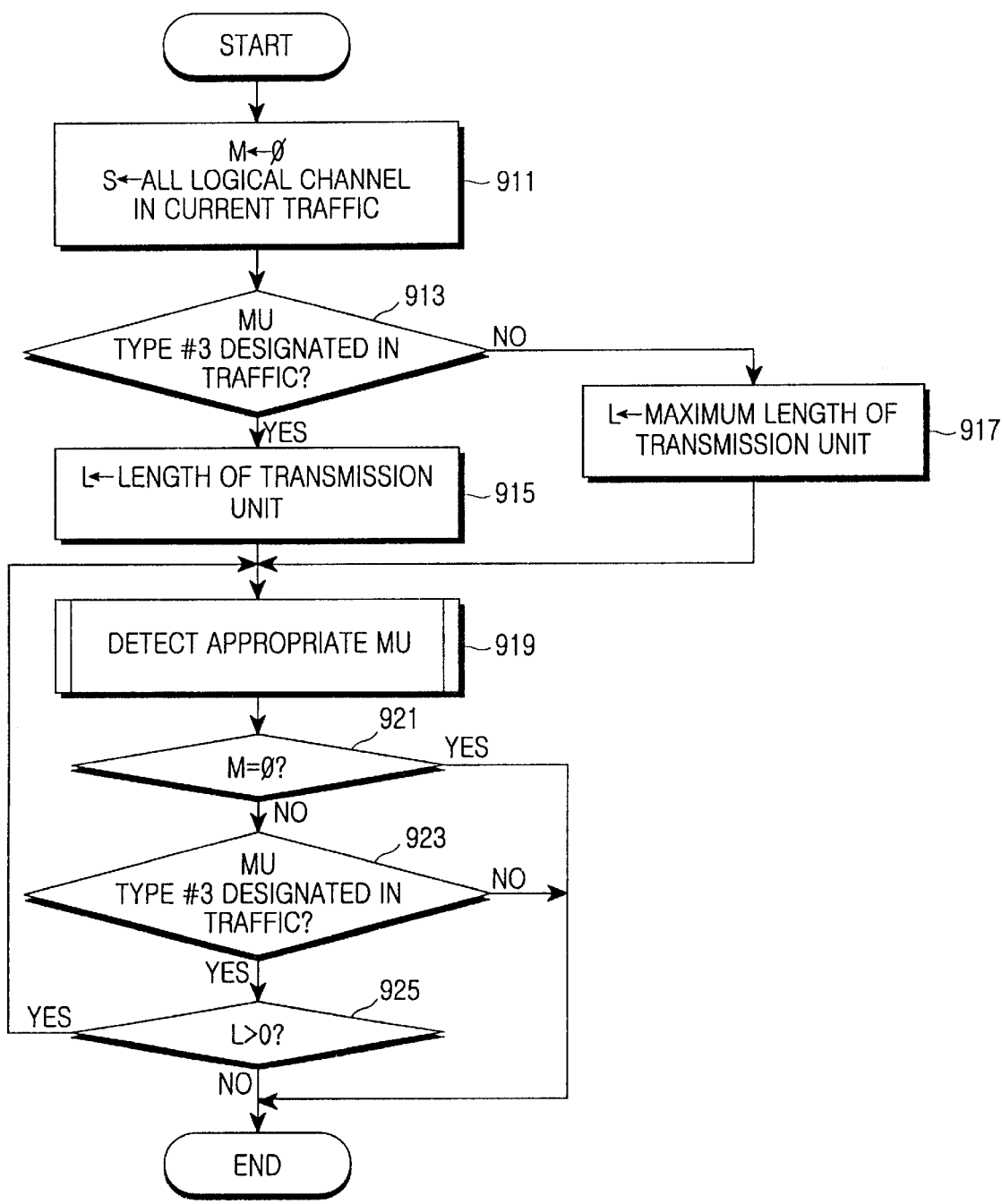
FIGS. 9, 10, and 11 are flowcharts depicting an operation of a logical channel mapper at a transmission side according to an embodiment of the present invention.
Figure 10A:
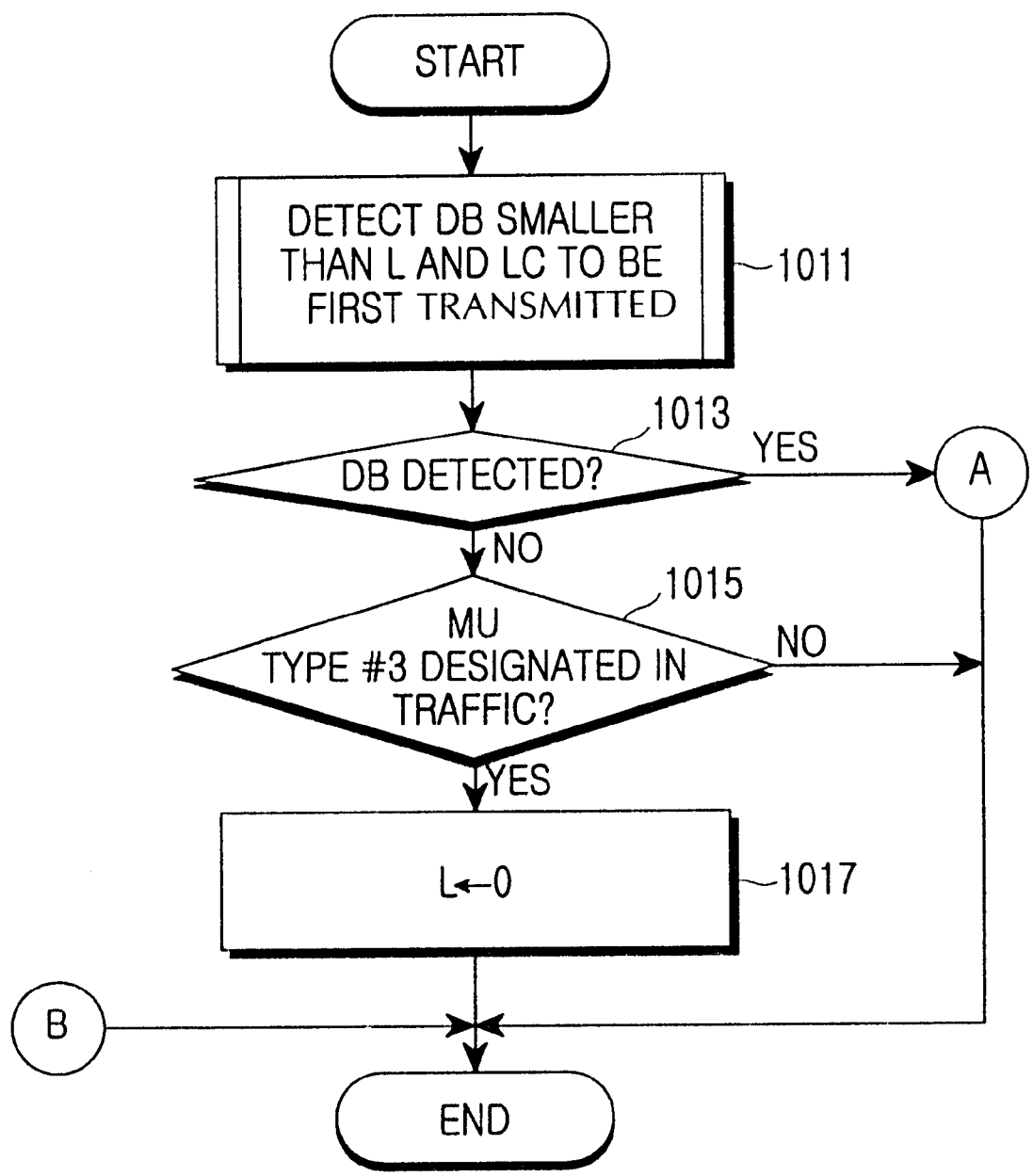
Figure 10B:
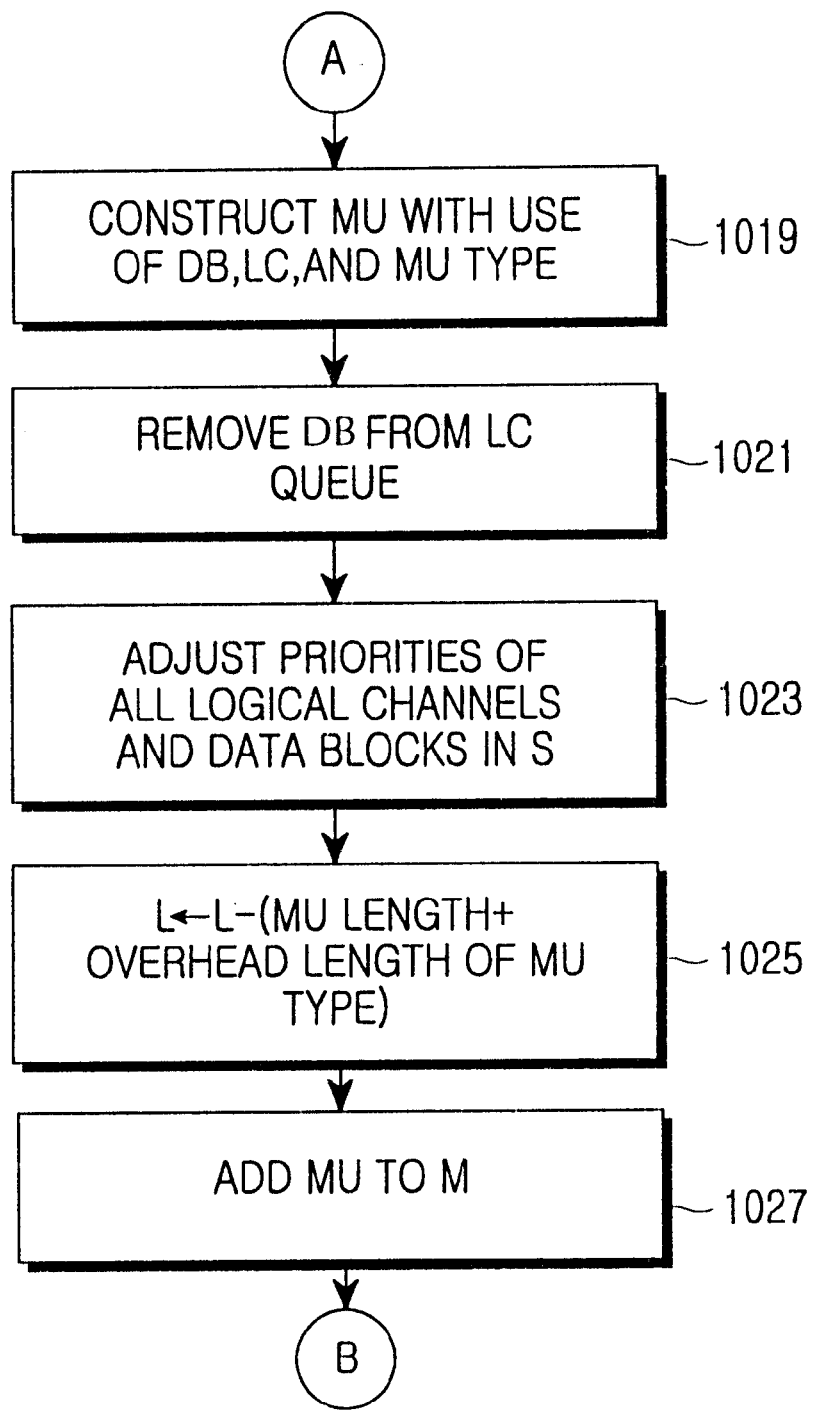
Figure 11A:
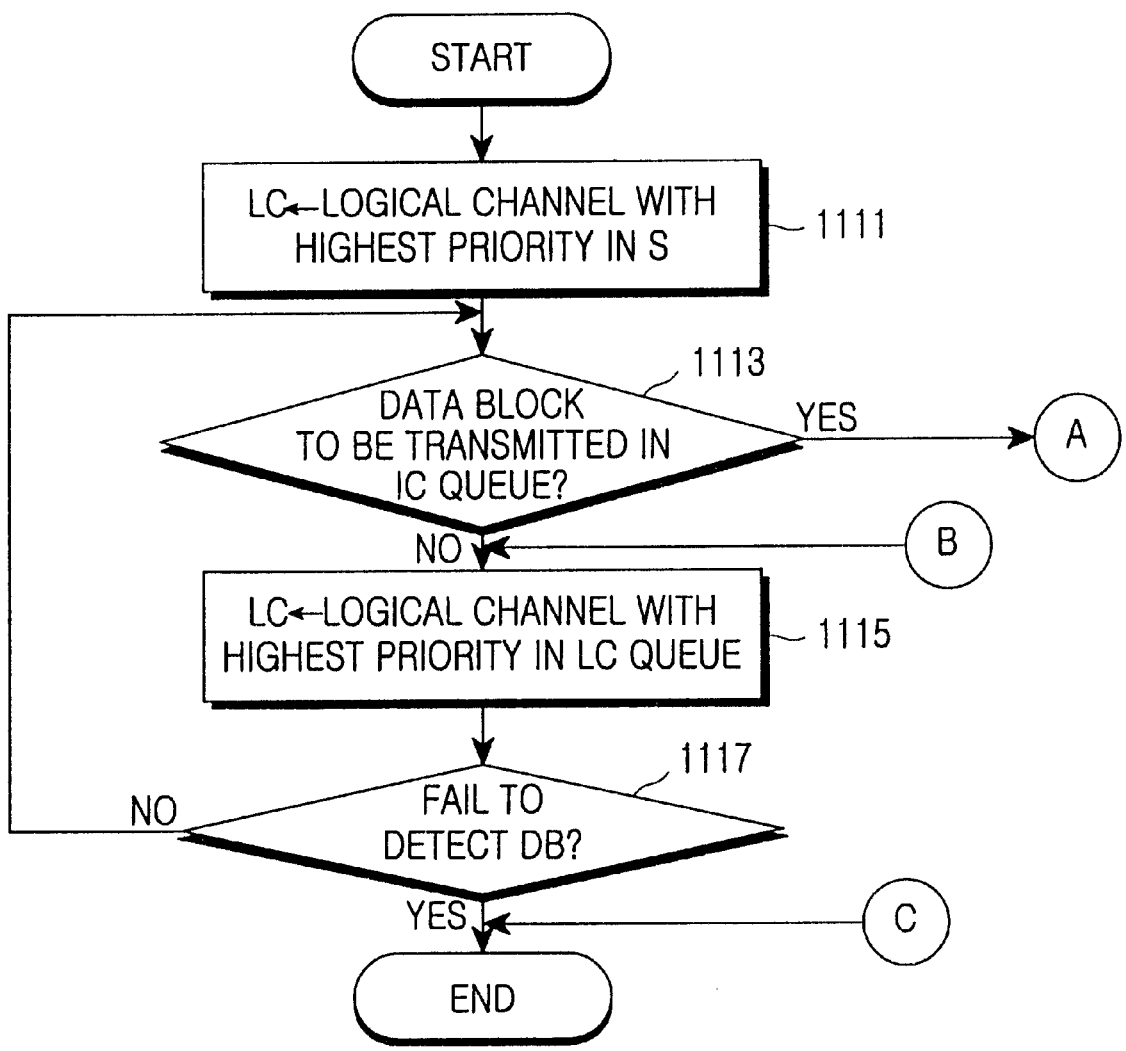
Figure 11B:
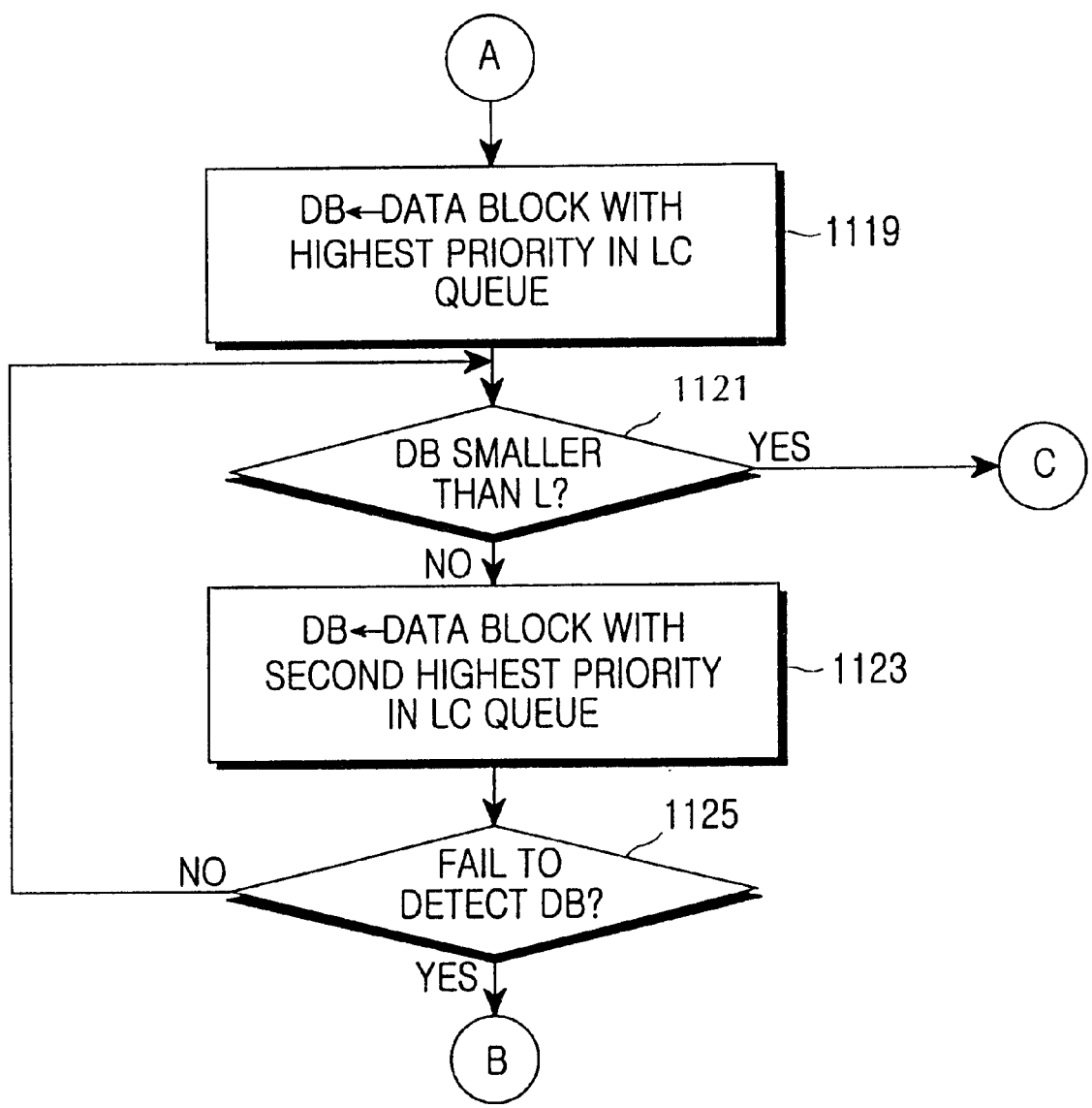
Figure 12:
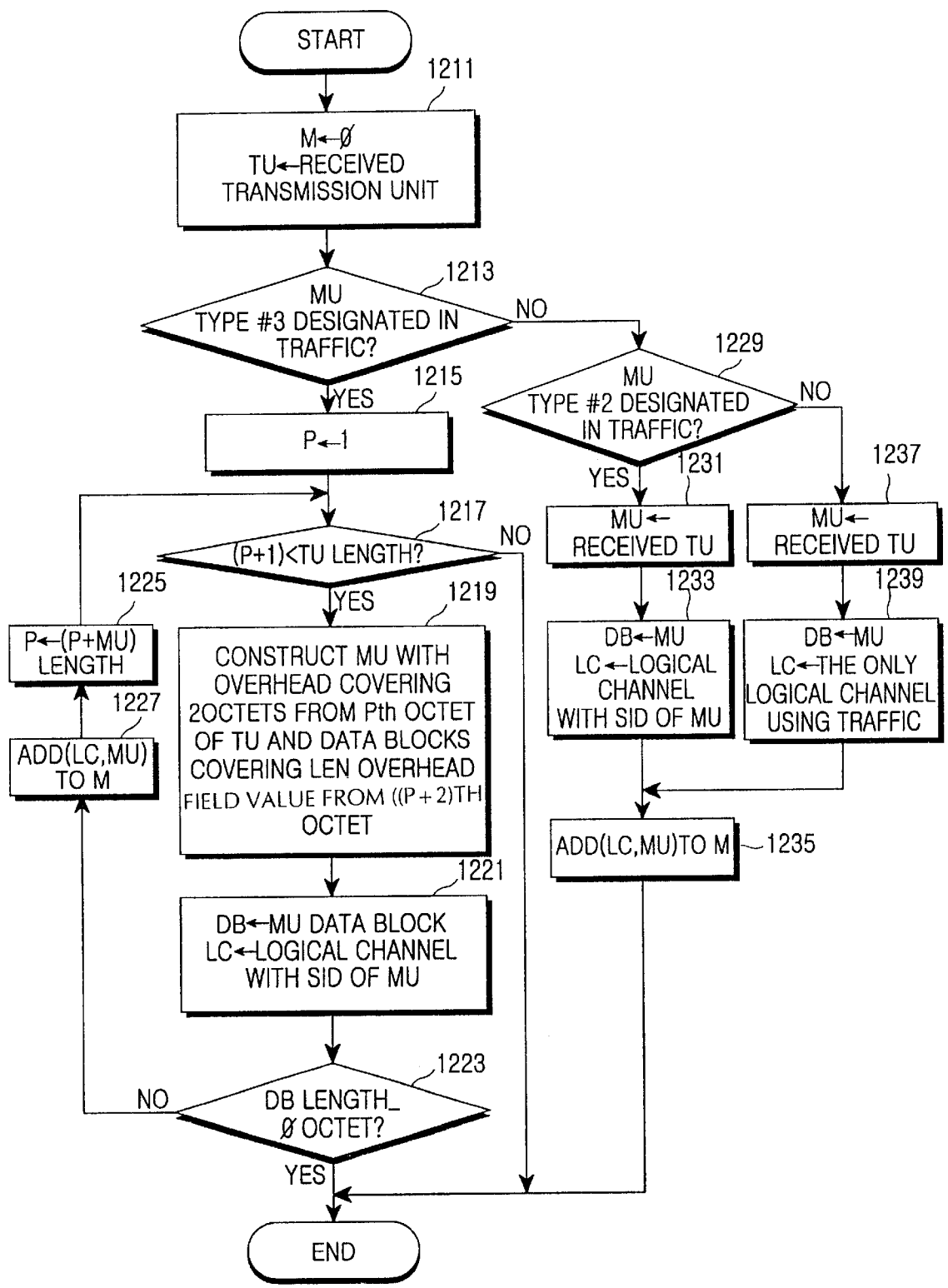
FIG. 12 is a flowchart depicting an operation of a logical channel mapper at a reception side according to the embodiment of the present invention.

FIGS. 9, 10, and 11 are flowcharts depicting an operation of a logical channel mapper at a transmission side, and FIG. 12 is a flowchart depicting an operation of a logical channel mapper at a reception side.

FIG. 9 is a flowchart depicting an operation of the logical channel mapper at the transmission side. Referring to FIG. 9, the logical channel mapper initially constructs a transmission unit. In step 911, the logical channel mapper sets a set M to an initial value and stores all logical channel information which can be transmitted in the current traffic in a set S. A transmission unit corresponds to a traffic and only specific logical channels can be mapped to this traffic. Therefore, only logical channels which can transmit data blocks in the current traffic can be included in the set S.

Figure 13:
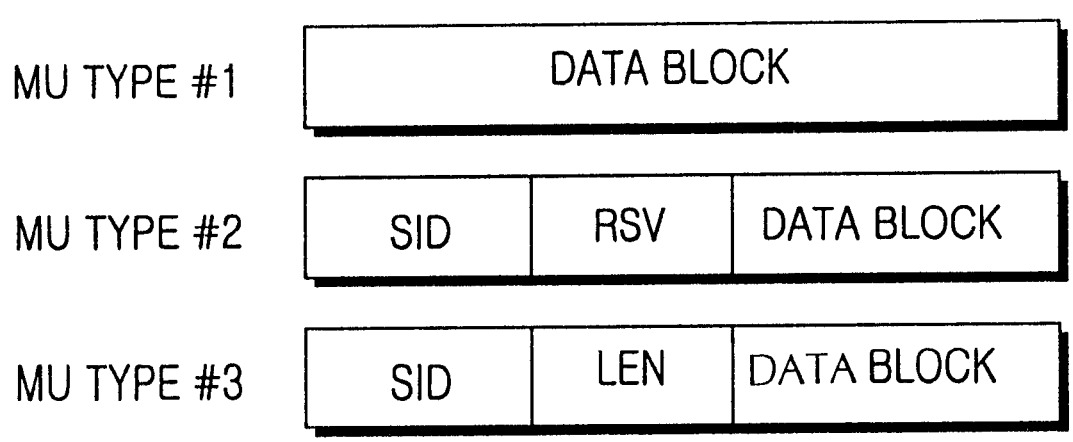
FIG. 13 illustrates three multiplex unit types suggested in the present invention.

A multiplex unit (MU) type designated for the traffic, from which a transmission unit is constructed, in step 913. MU types are shown in FIG. 13. Referring to FIG. 13, three MU types are shown and each MU type is comprised of a data block and an overhead field. The data block field includes an upper entity data block and the overhead field represents additional information needed to be stored in an MU. An MU type #1 has only a data block, for storing only one upper entity data block. An MU of type #1 is a single transmission unit.

An MU type #2 has an SID and an RSV (Reserved) in its overhead field. The SID occupies 2 bits and indicates what upper entity data block is stored in an MU. The RSV field occupies 6 bits and are all 0s. The MU of type #2 also stores only one upper entity data block and is a single transmission unit.

An MU type #3 is comprised of a data block and an SID and LEN (Length) as overhead fields. The SID occupies 2 bits and indicates what upper entity data block is stored in an MU. The LEN field occupies 14 bits and represents the size of the upper entity data block in bytes. The MU type #3 is the same as the MU types #1 and #2 in that one upper entity data block is stored in an MU, and different from them in that a plurality of MUs can form a transmission unit. A single transmission unit may include only a plurality of MUs of type #1 and the remaining non-filled portion of the transmission unit is filled with 0s.

One MU type is designated for one traffic. That is, the same traffic should use an identical MU type. Since an MU type is set for each traffic, the logical channel mapper determines whether an MU type designated for the traffic is #3 in step 913 of FIG. 9. In the case of the MU type #3, the logical channel mapper sets the length of a transmission unit to a maximum value since a plurality of MUs are converted into one transmission unit, in step 917. If the MU type is not #3, the logical channel mapper sets the length of the transmission unit to a predetermined value since one MU is one transmission unit, in step 915.

The physical channel M/D generates information bits for transmission based on a transmission unit received from the logical channel mapper as stated above. Hence, the size of the transmission unit is very significant to determining an IBS. If the size of the transmission unit is determined in the above steps, the logical channel mapper constructs an appropriate MU in step 919.

The MU is constructed in the procedure of FIG. 10. Referring to FIG. 10, the logical channel mapper detects an upper entity data block (DB) to be first transmitted and smaller than the size of the transmission unit, and a logical channel (LC) having the block, in step 1011. FIG. 11 illustrates the operation of detecting the DB and the LC.

Referring to FIG. 11, the logical channel mapper detects a logical channel with the highest priority in the set S and defines the logical channel as the LC, in step 1111. In step 1113, the logical channel mapper determines whether there exist data blocks to be transmitted in an LC queue. In the absence of any data block to be transmitted in the LC queue, the logical channel mapper detects a logical channel with the second highest priority and defines it as a new LC in step 1115. If the logical channel mapper fails to detect the logical channel with the second highest priority in step 1117, the procedure ends. If there are no logical channel having a data block by repeating the above steps, the procedure ends.

Upon detection of a logical channel having a data block to be transmitted in step 1113, the logical channel mapper defines a data block with the highest priority in the LC queue as a DB in step 1119. Then, the logical channel mapper determines whether the size of the DB is smaller than L. If the size of the DB is smaller than or equal to L, the logical channel mapper returns to the procedure of FIG. 10 with the LC and DB.

If the DB is larger than L, the logical channel mapper detects a data block with the second highest priority in the LC and defines the detected data block as a new DB in step 1123. In the absence of the data block with the second highest priority, the logical channel mapper returns to step 1115 in order to detect the logical channel with the second highest priority.

If the size of an obtained DB is larger than L after the steps subsequent to step 1115, the logical channel mapper returns to step 1123 to detect a data block following the obtained DB in priority. If the size of the obtained DB is smaller than or equal to L, the logical channel mapper returns to the procedure of FIG. 10 with the obtained LC and DB. If it fails to detect a satisfactory LC and DB in the set S, the logical channel mapper returns to the procedure of FIG. 10 without the LC and DB.

If an LC and DB smaller than L are found in the procedure of FIG. 11, the DB is converted into a transmission unit. That is, the logical channel mapper constructs an MU based on the DB and a designated MU type in step 1019 of FIG. 10 and removes the DB from the LC queue in step 1021. In step 1023, the logical channel mapper updates the transmission priorities of the logical channels and the data blocks in the set S to reflect the transmission of the DB. After the transmission of the DB, a data block second to the DB in priority is set as a new DB and thus the priorities of the overall data blocks are changed. The logical channel mapper sets L to the maximum size of a data block which can be accommodated in the remaining space of the transmission unit in step 1025 and then adds the constructed MU to an MU set M in step 1027. Then, the logical channel mapper goes to step 921 of FIG. 9.

If the logical channel mapper fails to detect an intended data block in the procedure of FIG. 11, it determines whether the MU type designated for the traffic is #3 in step 1015 of FIG. 10. In the case of the MU type #3, the logical channel mapper sets L to 0 to indicate that appropriate data blocks can be detected no more in step 1017. If the MU type is not #3, the procedure of FIG. 10 ends.

Returning to FIG. 9, the logical channel mapper determines whether the MU type designated for the traffic is #3 in step 923. If it is #3, the logical channel mapper determines whether L is 0 in step 925. If L is not 0, the logical channel mapper returns to step 919. If L is 0, the procedure of FIG. 9 ends.

If there is no MU to be transmitted after the procedure, M is 0. Otherwise, M includes a set of MUs to be transmitted. A transmission unit is constructed out of M in a way which varies in accordance with an MU type. That is, for the MU types #1 and #2, M has only one MU and this MU becomes a transmission unit. In the MU type #3, M includes a plurality of MUs, the MUs are sequentially arranged in the transmission unit, the remaining space of the transmission unit is filled with 0s. The completed transmission unit is transmitted to a physical channel M/D in charge of transmission of the corresponding traffic.

FIG. 12 is a flowchart depicting an operation of a logical channel mapper at a reception side. Upon reception of a transmission unit from a physical channel M/D of the reception side, the logical channel mapper sets the received transmission unit as TU in step 1211, and distinguishes MUs from the received transmission unit referring to an MU type designated for the traffic and in current use in step 1213. That is, if the MU type is #3 in steps 1213 and 1229, the procedure goes to step 1215. If it is #2, the procedure goes to step 1231. If it is #1, the procedure goes to step 1231.

In the case of the MU type #1, the transmission unit is an MU. Therefore, the logical channel mapper considers all the received MUs to be data blocks in step 1239. Since one logical channel exclusively uses a traffic in the MU type #1, corresponding logical channel information is stored in LC. Then, the received data blocks and the logical channel information are added to M in step 1235. In the case of the MU type #2, information about a logical channel with the number corresponding to the SID of a received MU in step 1233 and adds a received data block and the logical channel information to M in step 1235. In the case of the MU type #3, the logical channel mapper sequentially separates MUs from the received transmission unit using a pointer P. the pointer P indicates the position of a data byte which is being read. That is, if the first byte is read, 1 is stored in P, and if the last byte of the transmission unit is read, P has the size of the transmission unit. The logical channel mapper determines whether there is any remaining MU to be processed in the transmission unit in step 1217. As stated above, the MU of the type #3 should be as large as or larger than 3 bytes to include at least one-byte data since the MU type #3 has a 2-byte header. Therefore, only if (P+1) is smaller than the size of the transmission unit, a valid MU can exist. If there are more MUs in step 1217, the 2-byte header is read at the position indicated by P, the first byte of the two is designated as a logical channel number, and a data block with a length indicated by the second byte is separated in step 1219. In step 1221, the separated data block and the logical channel number are stored in DB and LC, respectively, and it is determined whether the length of DB is 0. If DB is as long as 0, which implies that no more valid MUs remain in the transmission unit, the logical channel mapper ends the procedure of FIG. 12. If DB is longer than 0, the data block and the logical channel number are added to M in step 1227, and P is moved to the starting point of the next MU in step 1225. The logical channel mapper returns to step 1217 to sequentially separate MUs, starting from the position indicated by P if more MUs are present. Since the length of each MU can be found by analyzing its overhead field LEN, the MUs can be sequentially separated by repeating steps 1219 to 1225.

If an LC and a set of MUs are obtained in the procedure of FIG. 12, the logical channel mapper sends corresponding data blocks to an upper entity.

In the above procedures, the MUX and QoS sublayer multiplexes/demultiplexes data blocks received from an upper entity and transmits them to a destination upper entity.

The MUX and QoS sublayer should ensure QoS on a proper level for each upper entity during the operation. This is more significant in the CDMA 2000 system which supports a multimedia service like moving pictures.

Methods of controlling QoS offered from the MUX and QoS sublayer are shown in (table 4).

TABLE 4

| Entity | Property |
| --- | --- |
| physical channel M/D | IBS set, current transmission rate set, and QoS control block |
| logical channel mapper | mapping table, traffic information list, and QoS control block. |

The physical channel M/D constructs information bits of a physical channel frame based on an available IBS. If the transmission rate of a physical channel is changed, the structure of the physical channel frame and thus the number of the information bits are also varied. Therefore, the available IBS should be different from a conventional IBS. For this purpose, the IBS set and the current transmission rate set are designated as properties of the physical channel M/D. The IBS set is actually a set of transmission rate and IBS pairs. The current transmission rate set includes transmission rate supported by a current physical layer.

It can be easily noted that an IBS having a transmission rate in the current transmission rate set as its pair is an available IBS. That is, to designate an IBS as available, its transmission rate should be present in the current transmission rate set.

If IBSs transmissible at all the transmission rates supported by the physical layer form the IBS set, there is no need for changing the IBS despite a change of the current transmission rate set. Since the IBS set includes all IBSs available at changed transmission rates, the current transmission rate is simply changed so that information bits are constructed based on a new IBS.

The QoS block of the physical channel M/D provides information necessary to determine the priorities of different traffics and transmission units received from different logical channel mappers. The important thing is that only a transmission priority can be determined based on the information since the MUX and QoS sublayer performs a multiplexing/demultiplexing operation without assembling or disassembling data blocks.

The logical channel mappers has three properties: mapping table, traffic information list, and QoS control block. The mapping table maps a logical channel supported by the logical channel mapper with a specific traffic. Generally, the logical channel mapper maps a logical channel with one traffic but a DTCH mapper maps a DTCH with first or second traffic, which incurs the need for the mapping table. The mapping table maps a logical channel with a corresponding traffic and designates an ID to the logical channel for its identification in the traffic.

The traffic information list stores an MU type for each traffic and QoS provided by each physical channel M/D. The MU type is used for the logical channel to form a transmission unit. The traffic QoS is a criterion in determining to which physical channel M/D a transmission unit should be transmitted.

The QoS control block of the logical channel mapper provides information about QoS levels to be ensured for each logical channel. That is, if a plurality of logical channels form one traffic, it is determined which data block in which logical channel should be first transmitted referring to the QoS control block.

In accordance with the present invention as described above, multiplexing/demultiplexing between physical channels and logical channels, entities necessary in a MUX and QoS sublayer, and the functions of the entities are defined and a method of controlling QoS is suggested for a CDMA 2000 system, thereby efficiently providing various CDMA 2000 services.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A communication device at a transmission side in a mobile communication system having a plurality of service entities and a plurality of logic channels, each logic channel being mapped at the plurality of service entities, the communication device comprising:

a plurality of logical channels including a dedicated traffic channel (DTCH), a dedicated signalling channel (DSCH), a dedicated medium access control channel (DMCH), a common traffic channel (CTCH), a common signal channel (CSCH), and a common MAC control channel (CMCH);

a plurality of logical channel mappers for the respective logical channels for converting a received data block mapped on a logical channel to a traffic in a predetermined format;

a plurality of physical channel mutiplexers/demultiplexers (M/Ds) for physical channels, each for defining a traffic receivable from a logical channel mapper, receiving the traffic from the logical channel mapper, and demultiplexing the traffic onto a corresponding physical channel.

2. The communication device of claim 1, wherein the DTCH mapper converts a data block mapped on a DTCH among data blocks generated in a service entity to first and second traffics and transmits the first and second traffics to a corresponding physical channel multiplexer/demultiplexer (M/D).

3. The communication device of claim 1, wherein the DSCH mapper converts a data block mapped on a DSCH among data blocks generated in a service entity to a signalling traffic and transmits the signalling traffic to a corresponding physical channel multiplexer/demultiplexer (M/D).

4. The communication device of claim 1, wherein the DMCH mapper converts a data block mapped on a DMCH among data blocks generated in a service entity to a MAC control traffic and transmits the MAC control traffic to a corresponding physical channel multiplexer/demultiplexer (M/D).

5. The communication device of claim 1, wherein the CTCH mapper converts a data block mapped on a CTCH among data blocks generated in a service entity to a burst traffic and transmits the burst traffic to a corresponding physical channel multiplexer/demultiplexer (M/D).

6. The communication device of claim 1, wherein the CSCH mapper converts a data block mapped on a CSCH among data blocks generated in a service entity to the signalling traffic and transmits the signalling traffic to a corresponding physical channel multiplexer/demultiplexer (M/D).

7. The communication device of claim 1, wherein the CMCH mapper converts a data block mapped on a CMCH among data blocks generated in a service entity to the MAC control traffic and transmits the MAC control traffic to a corresponding physical channel multiplexer/demultiplexer (M/D).

8. The communication device of claim 1, wherein the plurality of physical channel multiplexer/demultiplexers M/Ds include a dedicated control channel (DCCH) M/D and a supplemental channel (SCH) multiplexer/demultiplexer (M/D).

9. The communication device of claim 8, wherein the plurality of physical channel M/Ds are matched with the DCCH mapper and the DTCH mapper, for demultiplexing the MAC control traffic, the signalling traffic, the first traffic, and the second traffic, and transmitting the demultiplexed traffics to the physical channels.

10. The communication device of claim 8, wherein the plurality of SCH M/Ds are matched with the DTCH mapper, for demultiplexing the first traffic and the second traffic and transmitting the demultiplexed traffics to a physical channel.

11. A communication device at a reception side in a mobile communication system having a plurality of service entities and a plurality of logical channels mapped to each service entity, the logical channels including a dedicated traffic channel (DTCH), a dedicated signaling channel (DSCH), a dedicated medium access control channel (DMCH), a common traffic channel (CTCH), a common signal channel (CSCH), and a common MAC control channel (CMCH), comprising:
  a plurality of physical channel multiplexers/demultiplexers (M/Ds) corresponding to associated physical channels, for defining a traffic transmissible to a logical channel mapper, separating a signal received on a physical channel according to a traffic, comparing the traffic with the defined traffic, and transmitting the traffic to a corresponding logical channel mapper; and
  a plurality of logical channel mappers for the respective logical channels, each for receiving the traffic, separating the traffic into data blocks, and transmitting the data blocks to a corresponding service entity.

12. The communication device of claim 11, wherein the traffic corresponds to one transmission unit.

13. The communication device of claim 12, wherein the transmission unit has a multiplex unit including a service identification SID and a data block.

14. The communication device of claim 12, wherein the transmission unit further comprises information about the length of the data block.

15. The communication device of claim 13, wherein the logical channel mapper transmits the separated data block to a corresponding service entity by use of the service identification SID.

16. A communication method at a transmission side in a mobile communication system having a plurality of logical channels mapped to service entities, the logical channels including a dedicated traffic channel (DTCH), a dedicated signaling channel (DSCH), a dedicated medium access control channel (DMCH), a common traffic channel (CTCH), a common signal channel (CSCH), and a common MAC control channel (CMCH), a plurality of logical channel mappers mapped respectively on the logical channels and a physical channel multiplexer/demultiplexer (M/D) which defines a traffic receivable from the logical channel mapper and has at least one information bit structure (IBS), the method comprising the steps of:
  converting a received data block mapped on a respective logical channel to a traffic in a predetermined format; and
  transmitting a traffic receivable from a logical channel mapper as defined by the physical channel M/D, receiving the traffic from the logical channel mapper, and demultiplexing the traffic into a corresponding physical channel.

17. The communication method of claim 16, wherein the step of transmitting the traffic to the physical channel M/D by the logical channel mapper comprises the steps of:
  obtaining the length of a transmission unit;
  detecting multiplex units based on the length of the transmission unit; and
  transmitting the detected multiplex units.

18. The communication method of claim 17, wherein the step of obtaining the transmission unit length comprises the steps of:
  determining whether a multiplex unit designated for the traffic is the first multiplex unit; and
  setting a maximum transmission unit length if the designated multiplex unit is the first multiplex unit, and setting a predetermined transmission unit length if the designated multiplex unit is not the first multiplex unit.

19. The communication method of claim 17, wherein the step of detecting multiplex units comprises the steps of:
  detecting a logical channel with the highest priority, and a data block with the highest priority in the logical channel and with a length equal to or below the determined transmission unit length; and
  configuring a transmission unit using a multiplex unit type designated for a traffic of the data block and the logical channel if the data block and the logical channel are detected, and transmitting the transmission unit to the physical channel M/D.

20. The communication method of claim 19, further comprising the step of removing the data block with the highest priority if a plurality of data blocks exist in the logical channel after the transmission unit is generated.

21. The communication method of claim 20, further comprising the step of updating the transmission priorities of all the logical channels and data blocks after the data block with the highest priority is removed.

22. The communication method of claim 19, wherein the data block and logical channel detecting step comprises the steps of:

detecting a logical channel with the highest priority among all logical channels;

determining whether there is at least one data block received on the logical channel; and detecting a data block with the highest priority within the transmission unit length if there is at least one data block.

23. The communication method of claim 22, further comprising the step of setting the multiplex transmission unit length to 0 if the data block does not exist and the multiplex unit is the first multiplex unit.

24. The communication method of claim 16, wherein the demultiplexing step comprises the steps of:

detecting IBSs satisfying a transmission unit from the traffic received from the logical channel mapper;

determining whether the number of the detected IBSs is one;

determining whether the IBS is filled if the number of the detected IBSs is one; and demultiplexing the IBS if the IBS is filled and transmitting the demultiplexed IBS to a physical layer.

25. The communication method of claim 24, wherein if the detected IBS is not one, the detection continues until the number of information bits is one.

26. The communication method of claim 24, wherein if the detected IBS is not filled, the detection continues until the IBS is filled.

27. The communication method of claim 24, wherein the IBS detection step comprises the steps of:

detecting a traffic with a higher priority and a transmission unit satisfying at least one of the IBSs among the transmission units received from the logical channel mapper; and removing the other IBSs except for the IBS available for transmitting the traffic and the transmission unit if the traffic and transmission unit are detected.

28. The communication method of claim 27, further comprising the steps of:

determining whether the traffic to be transmitted has a transmission unit if the traffic and transmission unit are not detected; and selecting an IBS if the traffic has a transmission unit, removing the other IBSs, and removing all the IBSs if there is no a transmission unit in the traffic.

29. The communication method of claim 27, wherein the step of detecting the traffic and IBS comprises the steps of:

selecting a traffic with the highest priority among the received traffic;

determining whether there exists at least one transmission unit for the selected traffic;

selecting a transmission unit with the highest priority if the at least one transmission unit exists for the selected traffic;

determining whether there is an IBS supporting the selected transmission unit; and setting the transmission unit of the traffic as a transmission unit to be transmitted if the IBS exists.

30. The communication method of claim 29, further comprising the step of selecting a traffic with the second highest priority if the at least one transmission unit of the highest priority does not exist for the traffic with the highest priority.

31. The communication method of claim 30, wherein the traffic with the second highest priority does not exist, the IBS and traffic detection ends.

32. The communication method of claim 29, further comprising the step of selecting a transmission unit of next highest priority in the absence of the IBS supporting the transmission unit of the selected traffic.

33. The communication method of claim 32, wherein when the traffic with the second highest priority does not exist, the IBS and traffic detection ends.

34. A communication method at a reception side in a mobile communication system having a plurality of logical channels mapped to service entities, the logical channels including a dedicated traffic channel (DTCH), a dedicated signaling channel (DSCH), a dedicated medium access control channel (DMCH), a common traffic channel (CTCH), a common signal channel (CSCH), and a common MAC control channel (CMCH), a plurality of logical channel mappers mapped respectively on the logical channels, and a physical channel multiplexer/demultiplexer (M/D) which defines a traffic transmittable to a corresponding one of a plurality of logical channel mappers having at least one information bit structure (IBS), the method comprising the steps of:

transmitting information bits of a physical channel frame to the physical channel M/D by a physical layer upon reception of the physical channel frame;

separating each traffic from the information bits by the physical channel M/D upon reception of the information bits and multiplexing each separated traffic to its respective corresponding logical channel mapper; and transmitting the received traffics to corresponding service entities on corresponding logical channels by the logical channel mappers upon reception of the traffic.

35. The communication method of claim 34, wherein the step of multiplexing the traffic to the logical channel mapper by the physical channel M/D comprises the steps of:

detecting an IBS based on format bits upon reception of information bits with the format bits from the physical layer;

detecting a transmission unit and a traffic to which the transmission unit belongs based on the detected IBS; and transmitting the traffic and the transmission unit of the traffic to a corresponding logical channel.

36. The communication method of claim 34, wherein the step of transmitting the received transmission unit to a corresponding service entity by the logical channel mapper comprises the steps of:

identifying a multiplex unit type of the received transmission unit referring to the multiplex unit type;

separating multiplex units from the transmission unit using a pointer indicating the position of a data byte if the multiplex unit type is the first multiplex unit type; and separating multiplex units from the transmission unit using information about a logical channel with the number corresponding to a service identification (SID) of the multiplex unit if the multiplex unit type is the second multiplex unit type.

37. The communication method of claim 36, wherein the pointer has the length of the transmission unit when the pointer reads the last byte.

38. The communication method of claim 35, wherein if the transmission unit is of the first multiplex unit type, the transmission unit is 3 bytes long to have at least one-byte data.

* * * * *